H. HECOX.

Sap-Spout.

No. 29,884. Patented Sept 4, 1860.

Witnesses:
O. S. Oaks
Allen Waldo

Inventor:
Homer Hecox

UNITED STATES PATENT OFFICE.

HOMER HECOX, OF RUTLAND, NEW YORK.

IMPROVEMENT IN SAP-CONDUCTORS.

Specification forming part of Letters Patent No. 29,884, dated September 4, 1860.

*To all whom it may concern:*

Be it known that I, HOMER HECOX, of Rutland, in the county of Jefferson and State of New York, have invented a new and Improved Sap-Conductor; and I do hereby declare that the following is a full, clear, and exact description of the same, reference being had to the accompanying drawings, forming a part of this specification, in which—

Figure 1:
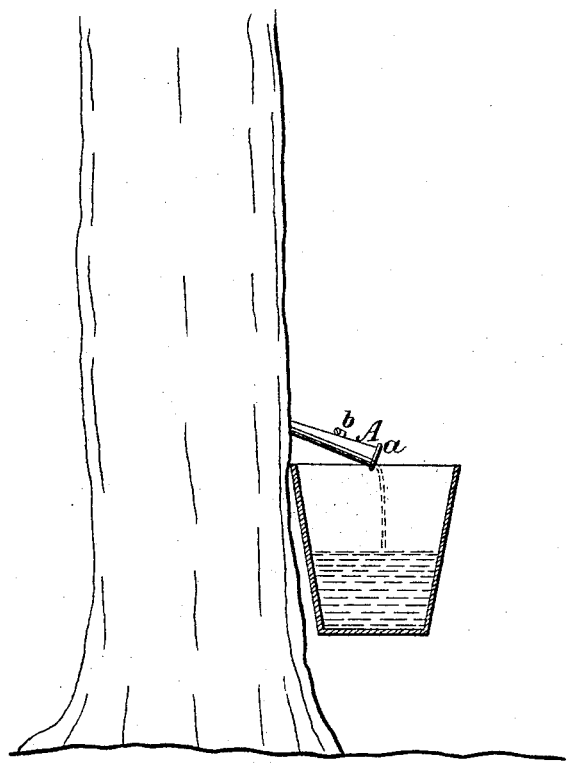
Figure 2:
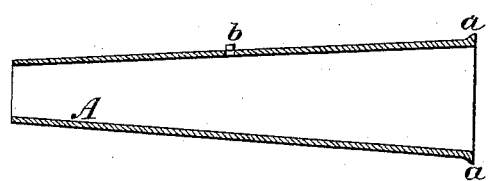

Figure 1 represents one of my conductors or spiles in its application to a tree, and Fig. 2 is a longitudinal vertical section of my invention.

Similar letters of reference in both views indicate corresponding parts.

When the trees are tapped in the usual manner, and if a common wooden spile is used for conducting the sap from the trees to the buckets, the inconveniences are numerous. The sap, when running through an open wooden spile, is liable to be blown away or dried up by the wind, and also to slime when the tree has to be retapped, causing a great loss of time and a damage to the tree and diminishing considerably the quantity of sap which would otherwise be obtained. The buckets are also liable to tip over if the same are placed on the melting snow on the ground, and they are accessible to mice and other vermin, that destroy some of the sap, or they (the buckets) have to be suspended from nails driven expressly for the purpose into the trees, which operation not only requires some extra time, but it is also injurious to the trees. To overcome all these difficulties I have constructed my conductor or spile of a tapering metallic tube with a projection or nose on its upper side, so that the same may be driven firmly into the tree and the bucket suspended from the same, as will be hereinafter more fully explained.

To enable those skilled in the art to make and use my invention, I will proceed to describe its construction and application.

A represents a tube, tapering from one end to the other, and constructed of tin or some other metal which is not affected by coming in contact with the sap. Its smaller end is made sharp and of a size to suit a particular auger, and the large end is strengthened by a rim, *a*, as clearly shown in Fig. 2, so that the tube can be driven firmly into a hole drilled in a tree. On its upper side, and in about the middle of the length, there is a projection or nose, *b*, that serves to retain the buckets. Said buckets are provided with a string or wire just long enough to slip over the nose *b*, as clearly represented in Fig. 1. Thus my spile serves the double purpose to conduct the sap and to support the buckets.

By the use of my spile the quantity of sap obtained is considerably greater, because the wind does not interfere with the same as it runs down to the buckets, there is no drying up and souring, and the buckets are inaccessible to vermin. By being suspended from the spile they are not liable to tip over if the snow begins to melt, and the sap can easily be collected, the collecting-vessel being held in one hand, while with the other the bucket is tilted over, so as to discharge its contents. There is no necessity for retapping the trees, there being no appearance of slime or sourness about the spile or the orifice, so that the trees do not stop discharging sap, and by reason of its tapering form my spile takes hold chiefly in the bark of the tree and only few pores of the wood are stopped up, and the ice, which often forms within the conductor in cold weather, readily slips out of my tube, owing to its tapering shape. Thus by the use of my spile much time and labor are saved and the yield of sap is considerably increased.

Having thus described my invention, I claim as new and desire to secure by Letters Patent—

As an improved article of manufacture, a metallic sap-conducting tube when made tapering in form and provided with a centrally-placed nose, *b*, and otherwise made as herein shown and described.

HOMER HECOX.

Witnesses:
O. S. OAKS,
ALLEN WALDO.